United States Patent
Li et al.

(10) Patent No.: US 12,189,110 B2
(45) Date of Patent: Jan. 7, 2025

(54) OPTICAL TRAP CALIBRATION APPARATUS AND METHOD BASED ON VARIATION OF ELECTRIC FIELD BY OPTICAL IMAGING OF NANOPARTICLE

(71) Applicants: ZHEJIANG LAB, Zhejiang (CN); ZHEJIANG UNIVERSITY, Zhejiang (CN)

(72) Inventors: Cuihong Li, Hangzhou (CN); Zhenhai Fu, Hangzhou (CN); Jing Jiang, Hangzhou (CN); Zhiming Chen, Hangzhou (CN); Yuanyuan Ma, Hangzhou (CN); Huizhu Hu, Hangzhou (CN)

(73) Assignees: ZHEJIANG LAB, Hangzhou (CN); ZHEJIANG UNIVERSITY, Hangzhou (CN)

(*) Notice: Subject to any disclaimer, the term of this patent is extended or adjusted under 35 U.S.C. 154(b) by 358 days.

(21) Appl. No.: 17/691,125

(22) Filed: Mar. 10, 2022

(65) Prior Publication Data

US 2022/0350125 A1     Nov. 3, 2022

(30) Foreign Application Priority Data

Apr. 25, 2021   (CN) .......................... 202110445513.3

(51) Int. Cl.
*G02B 21/32*     (2006.01)
*G21K 1/00*      (2006.01)
*G01N 15/00*     (2006.01)

(52) U.S. Cl.
CPC .............. *G02B 21/32* (2013.01); *G21K 1/006* (2013.01); *G01N 2015/0038* (2013.01)

(58) Field of Classification Search
CPC . G02B 21/32; G21K 1/006; G01N 2015/0038
See application file for complete search history.

(56) References Cited

U.S. PATENT DOCUMENTS

2022/0344070 A1* 10/2022 Li ........................ G02B 5/3083

FOREIGN PATENT DOCUMENTS

| CN | 111551250 A | 8/2020 |
| CN | 111750778 A | 10/2020 |

(Continued)

OTHER PUBLICATIONS

CN First Office Action(202110445513.3); Date of Mailing: Jun. 3, 2021.

*Primary Examiner* — Nicole M Ippolito
(74) *Attorney, Agent, or Firm* — W&G Law Group

(57) ABSTRACT

Disclosed is an optical trap calibration apparatus and method based on variation of electric field by optical imaging of a nanoparticle. By means of a direct optical imaging method, a linear nanoparticle equilibrium position displacement under the action of a constant electric field is measured to realize calibration, thereby avoiding the introduction of error signals, and improving the reliability of differential calibration. The specific calibration method and apparatus of the present invention are not only suitable for calibration of electric field quantity, but also suitable for the calibration of other magnetic forces and the like. By means of the accurate calibration of mechanical quantity in the present invention, the development and application of the vacuum optical trap sensing technology can be promoted.

5 Claims, 4 Drawing Sheets

(56) References Cited

FOREIGN PATENT DOCUMENTS

| | | |
|---|---|---|
| CN | 112051239 A | 12/2020 |
| CN | 112485163 A | 3/2021 |
| WO | 2007116365 A2 | 10/2007 |
| WO | 2018213723 A1 | 11/2018 |

\* cited by examiner

OPTICAL TRAP CALIBRATION APPARATUS AND METHOD BASED ON VARIATION OF ELECTRIC FIELD BY OPTICAL IMAGING OF NANOPARTICLE

CROSS-REFERENCE TO RELATED APPLICATIONS

The present application claims priority to Chinese Patent Application No. 202110445513.3, filed on Apr. 25, 2021, the content of which is incorporated herein by reference in its entirety.

TECHNICAL FIELD

The present invention relates to the field of force calibration, in particular to an optical trap calibration apparatus and method based on variation of electric field by optical imaging of a nanoparticle.

BACKGROUND

Since the optical tweezers technology is well-known, as a universal tool for capturing and manipulating neutral particles, it has been widely studied and applied in the fields of molecular biology, nanotechnology, experimental physics and so on. The optical tweezers can be understood as a simple harmonic oscillator by suspending particles using laser beams. Comparing with a traditional vibrator model, the optical tweezers has no contact mechanical dissipation; and further, different from an optical tweezers system in liquid or air medium, the optical tweezers system running in vacuum can realize complete isolation of a suspension unit from the environment. Based on the above-mentioned advantages, the vacuum optical tweezers technology is used in basic physics such as thermodynamics, quantum physics and sensing filed, and scientists in the field of applied physics have carried out a lot of researches with optical tweezers in vacuum.

In the field of applying a vacuum optical trap for high-sensitivity mechanical quantity sensing, sensing particles are usually suspended in the vacuum optical trap through the optical tweezers technology, and a force field sensed by the particles is analyzed out by measuring changes in scattered light signals of the sensing particles. Usually, the first thing to do in signal analysis is to establish a relationship between a forward-scattered light differential signal of the trapped particle and the position of the particle in the optical trap, and the establishment of this correspondence is a calibration process. The current calibration method for nano-scale sensing particles is realized by testing a free accelerated movement displacement of the particle in the force field, specifically, the particle is cooled to the central position of the optical trap by using cooling technology, then a capture light source is turned off, after the particle performs accelerated movement in a constant force field for a period of time, the particle is re-captured, and the change in a differential signal of the particle is observed to realize the force field calibration of the particle. This method requires fast and accurate switching control of the light source and the external constant force field, there are many sources of error, and the test method is not direct.

SUMMARY

Aiming at the shortcomings of the prior art, the present invention provides an optical trap calibration apparatus and method based on variation of electric field by optical imaging of a nanoparticle. By means of precise calibration of mechanical quantity, the development and application of the vacuum optical trap sensing technology will be promoted, and the direct imaging of particles can also help a user directly detect the performance and dynamic behaviors of the particles.

The purpose of the present invention is realized by means of the following technical solutions:

An optical trap calibration apparatus based on variation of electric field by optical imaging of a nanoparticle, including: a first laser, a second laser, a vacuum chamber, an objective lens, an electric field imposing unit, an electric field quantity control unit, a beam splitter, a filter unit, a convex lens, and an imager.

The beam splitter, the objective lens and the electric field imposing unit are sequentially arranged on the optical axis of the first laser; the vacuum chamber encompasses the objective lens and the electric field imposing unit, so as to provide a vacuum environment for the nanoparticle; the electric field imposing unit is externally connected to the electric field quantity control unit, and the electric field imposing unit can generate parallel electric fields in three directions of x, y and z.

An optical axis of the second laser is perpendicular to the optical axis of the first laser, and a point of intersection of the two optical axes coincides with a focal point of an optical potential well formed by the objective lens.

The filter unit, the convex lens and the imager are sequentially arranged on a reflection light path of the beam splitter, and the filter unit can isolate an emission wavelength of the first laser and transmit the emission wavelength of the second laser.

Further, the imager is placed in a black box to suppress stray light for the imager.

Further, the beam splitter is a BS beam splitter or a dichroic mirror.

Further, the filter unit is an isolator or a filter.

Further, the electric field imposing unit is two pairs of parallel electrode plates.

An optical trap calibration method based on variation of electric field by optical imaging of a nanoparticle, the method is implemented based on the above-mentioned apparatus, and the method specifically includes the following steps:

S1: the first laser emitting capture laser with a wavelength of $\lambda_1$, the capture laser entering the vacuum chamber after passing through the beam splitter, and the objective lens performing focusing to form an optical potential well, so as to trap the nanoparticle in the optical potential well; ensuring that the nanoparticle carries electrons; the second laser emitting flat-top laser with a wavelength of $\lambda_2$ to irradiate the optical potential well.

S2: applying no electric field, and after the particle is cooled, recording scattered light distribution on the image plane of the imager.

S3: controlling, by means of the electric field control unit, the electric field imposing unit to apply a parallel electric field in an x direction or a y direction to the nanoparticle, respectively adjusting changes in the electric field strength, cooling the nanoparticle, and recording the scattered light distribution on the image plane of the imager. The x direction is a polarization direction of the optical trap capture laser, the transmit direction of light emitted by the first laser is z direction, and the direction perpendicular to x and z is y direction.

S4: obtaining the preimage of the trapped object utilizing deconvolution image processing referring to point spread function, and then calculating changes in the centroid position of the nanoparticle under the action of different electric field quantities through Gaussian image processing.

S5: obtaining a calibration coefficient in the x direction or the y direction according to a functional relationship between the changes in the centroid position of the nanoparticle and changes in the electric field quantity, so as to complete the calibration.

The beneficial effects of the present invention are as follows:

(1) The method of the present invention will promote the development and application of the vacuum optical trap sensing technology by means of the precise calibration of mechanical quantity.

(2) The apparatus of the present invention is compatible with the existing vacuum optical tweezers system, and does not interfere with the realization of its conventional functions.

(3) The particle imaging technology of the present invention can help the user monitor and perceive a particle delivery process, which is conducive to optimizing the effective capture efficiency of the nanoparticle.

(4) The apparatus of the present invention can also be used for imaging of particles, which helps the user directly monitor other properties and dynamic behaviors of the particles, such as particle adsorption, falling and so on.

Figure 1:
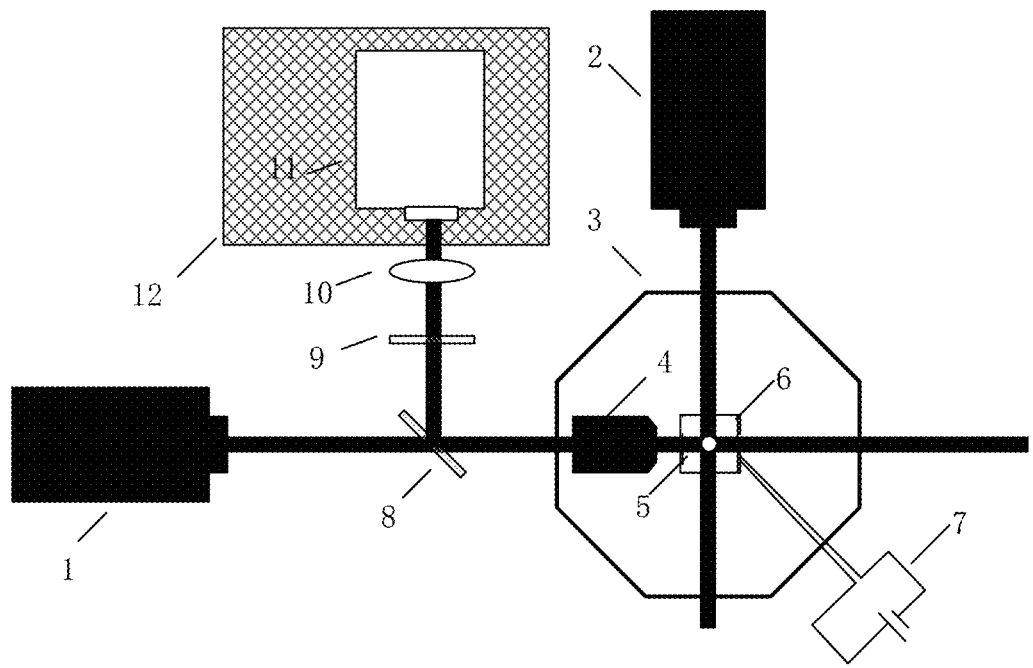
FIG. 1 is a schematic diagram of the apparatus of the present invention.

Reference signs: first laser 1, second laser 2, vacuum chamber 3, objective lens 4, nanoparticle 5, electrode plate 6, electric field quantity control unit 7, beam splitter 8, filter 9, convex lens 10, imager 11, and black box 12.

DESCRIPTION OF EMBODIMENTS

The present invention will be described in detail below according to the drawings and preferred embodiments, the purposes and effects of the present invention will become more apparent, and it should be understood that the specific embodiments described here are only used for explaining the present invention and are not intended to limit the present invention.

In an optical trap calibration apparatus based on variation of electric field by optical imaging of a nanoparticle of the present invention, a special light path system for dynamic imaging of particle positions is added into an original vacuum optical trap capturing light path system. That is, a parallel laser beam is used for directly irradiating a nanoparticle, so as to excite the scattering of the nanoparticle, and a tightly focused objective lens formed by an optical trap is used for collecting the scattered light of the particle against the parallel laser beam, and the collected scattered light is converged and imaged on an imager. Under different external electric field intensities, the positions of a group of particles on an image plane of the imager after cooling are measured, and the relationship between a centroid position and electric field quantity is calibrated in combination with a point spread function, so as to realize the calibration of the electric field quantity.

As shown in FIG. 1, as one of the embodiments, the apparatus of the present invention includes a first laser 1, a second laser 2, a vacuum chamber 3, an objective lens 4, an electric field imposing unit 6, an electric field quantity control unit 7, a beam splitter 8, a filter unit 9, a convex lens 10, and an imager 11.

The beam splitter 8, the objective lens 4 and the electric field imposing unit 6 are sequentially arranged on the optical axis of the first laser 1; the vacuum chamber 3 surrounds the objective lens 4 and the electric field imposing unit 6, so as to provide a vacuum environment for the nanoparticle; the electric field imposing unit 6 is externally connected to the electric field quantity control unit 7, and the electric field imposing unit 6 can generate parallel electric fields in three directions of x, y and z, and parallel electrode plates are preferably used.

The beam splitter 8 is a BS beam splitter or a dichroic mirror.

The optical axis of the second laser 2 is perpendicular to the optical axis of the first laser 1, and a point of intersection of the two optical axes coincides with a focal point of an optical potential well formed by the objective lens 4.

The filter unit 9, the convex lens 10 and the imager 11 are sequentially arranged on a reflection light path of the beam splitter 8, and the filter unit 9 is an isolator or a filter, which can isolate an emission wavelength of the first laser 1 and transmit the emission wavelength of the second laser 2.

In order to suppress stray light and improve the signal to noise ratio of imaging, the imager 11 is placed in a black box 12.

The nanoparticle is suspended in a vacuum optical trap, and the particle delivered into the optical trap is controlled to carry n electrons, which means that it has electric quantity q=ne; when no external electric field is applied, a mechanical model of the nanoparticle in the optical trap can be a simple harmonic oscillator model, that is, $F_1=k\Delta r$, where k represents the stiffness of the optical trap, $\Delta r$ represents the displacement of the centroid of the nanoparticle relative to an equilibrium position of the optical trap, and the direction of $F_1$ points to the equilibrium position. After an external electric field is applied, the potential energy of the optical trap changes, and the equilibrium position of the particle changes accordingly. When the nanoparticle is subjected to an external electric field force $F_2=qE$, the nanoparticle will establish a new equilibrium position in the optical trap.

$$\Delta r_0 = -\frac{qE}{k}$$

It can be seen from the above formula that, the relationship between the centroid equilibrium position $\Delta r_0$ and the electric field quantity E is only related to the electric quantity q of the nanoparticle and the stiffness k of the nanoparticle in the optical trap. For a vacuum optical trap system, after the power of the optical trap and a capture microsphere are determined, q and k will not change, therefore, the electric field quantity can be calibrated by changing the electric field quantity E and measuring the centroid equilibrium position $\Delta r_0$.

Figure 2:
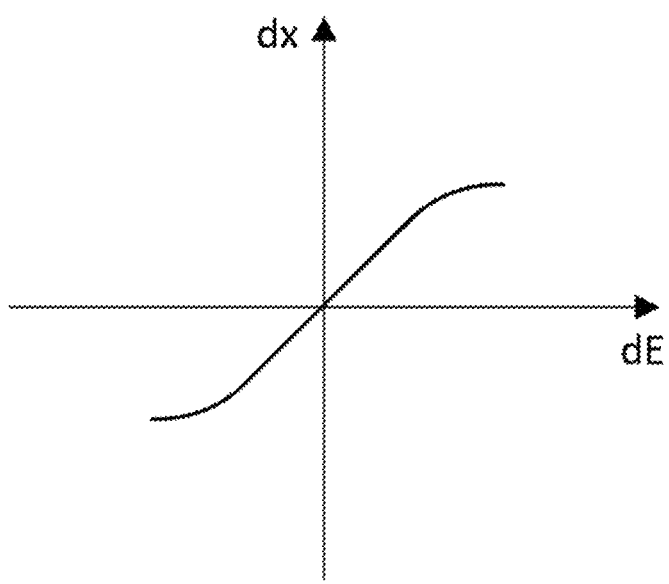
FIG. 2 is a schematic diagram of a change in electric field quantity with the displacement of a nanoparticle in the method of the present invention.

As shown in FIG. 2, with the increase of the external electric field in the x direction, the deviation of the particle from the central position in the x direction increases, due to an optical nonlinear effect, the optical potential well is not completely Gaussian, the stiffness of the microsphere in the optical trap is approximately linear when the distance from the particle to the central position of the trap is small, and is nonlinear when the distance is big; and therefore, as the electric field quantity changes, the change in the centroid equilibrium position is linear at first and then nonlinear. The present invention realizes the calibration of the electric field quantity of the particle by adjusting the external electric field quantity and measuring the equilibrium position after cooling. The electric field variation E can be adjusted with high precision by adjusting the voltage across the electrode plate, the sensitivity of electric field calibration is limited to the detection of the position of the microsphere; and based on the measurement apparatus shown in FIG. 1, the resolution of position imaging of the particle is limited to the diffraction resolution of an optical system of about 500 nm, which is equivalent to the size of the trapping area of an optical trap with a longitudinal size of about 1 μm×1 μm, such that it is difficult to calibrate. In order to improve the accuracy of electric field quality calibration based on the optical imaging method, the calibration method of the present invention introduces the image recognition technology: the image resolution is improved by deconvolution of the point spread function of an optical system, and the position of centroid is figured out by a two-dimensional Gaussian fitting algorithm of image. By measuring the centroid position of the cooled particle after a series of changes in the electric field, the relationship between the electric field quantity in the x-axis or y-axis direction and the displacement variation of the particle is established.

The method of improving the resolution by using the deconvolution image processing of the point spread function will be described below.

Figure 3:
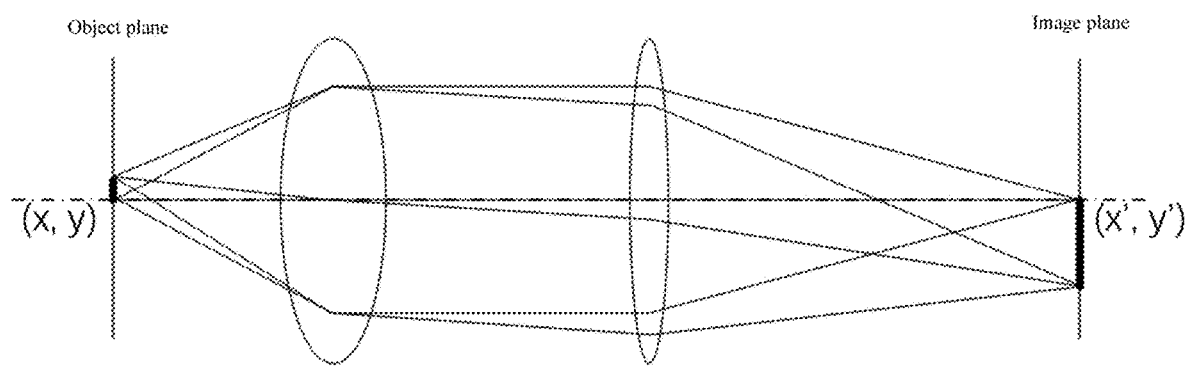
FIG. 3 is a schematic diagram of imaging from an object plane to an image plane in the reflection light path of the present invention.

An optical imaging part of the nanoparticle in the apparatus of the present invention can be simplified as an imaging system shown in FIG. 3. The light transmission direction is defined as a z direction, the electric field vibration direction of the captured light, that is, the polarization direction, is defined as an x direction, and the direction perpendicular to the two axes is defined as a y direction.

The optical field of a point object can be represented by a δ function, the input function is transformed by the imaging system, and an output function h(x', y') generated on an image plane is called the point spread function. The brightness of an extended object, which is located on an object plane, on the image plane is set as o(x, y), and since the object can be regarded as consisting of a series of point objects, o(x, y) can be written as consisting of a series of δ functions that form object point field distribution:

$$o(x,y)=\int_{-\infty}^{\infty}\int_{-\infty}^{\infty}o(u,v)\delta(x-u,y-v)dudv$$

The light intensity i(x', y') at each point on the image plane can be regarded as the linear superposition of the light intensity, which is formed by the light intensity o(x, y) at each point on the object plane at the image plane (x', y'), that is $$i(x',y')=\int_{-\infty}^{\infty}\int_{-\infty}^{\infty}o(x,y)h(x,y,x',y')dxdy$$

where h(x, y, x', y') represents the light intensity distribution of the point spread function that is formed on the image plane by an object point of a unit light intensity value at (x, y) on the object plane after passing through the optical system.

Since the position of the particle satisfies a paraxial condition, the light intensity distribution formed on the image plane by the object point of the unit light intensity value at any position (x, y) on the object plane is the same.

Mathematically, i(x', y') is the convolution of the two functions of o(x', y') and h(x', y'), which can be expressed as $$i(x',y')=o(x',y')*h(x',y')$$

That is, the intensity distribution of the image of the extended object can be expressed as the convolution of the point spread function of the system and an intensity distribution function of a geometric optical image of the object.

Figure 4:
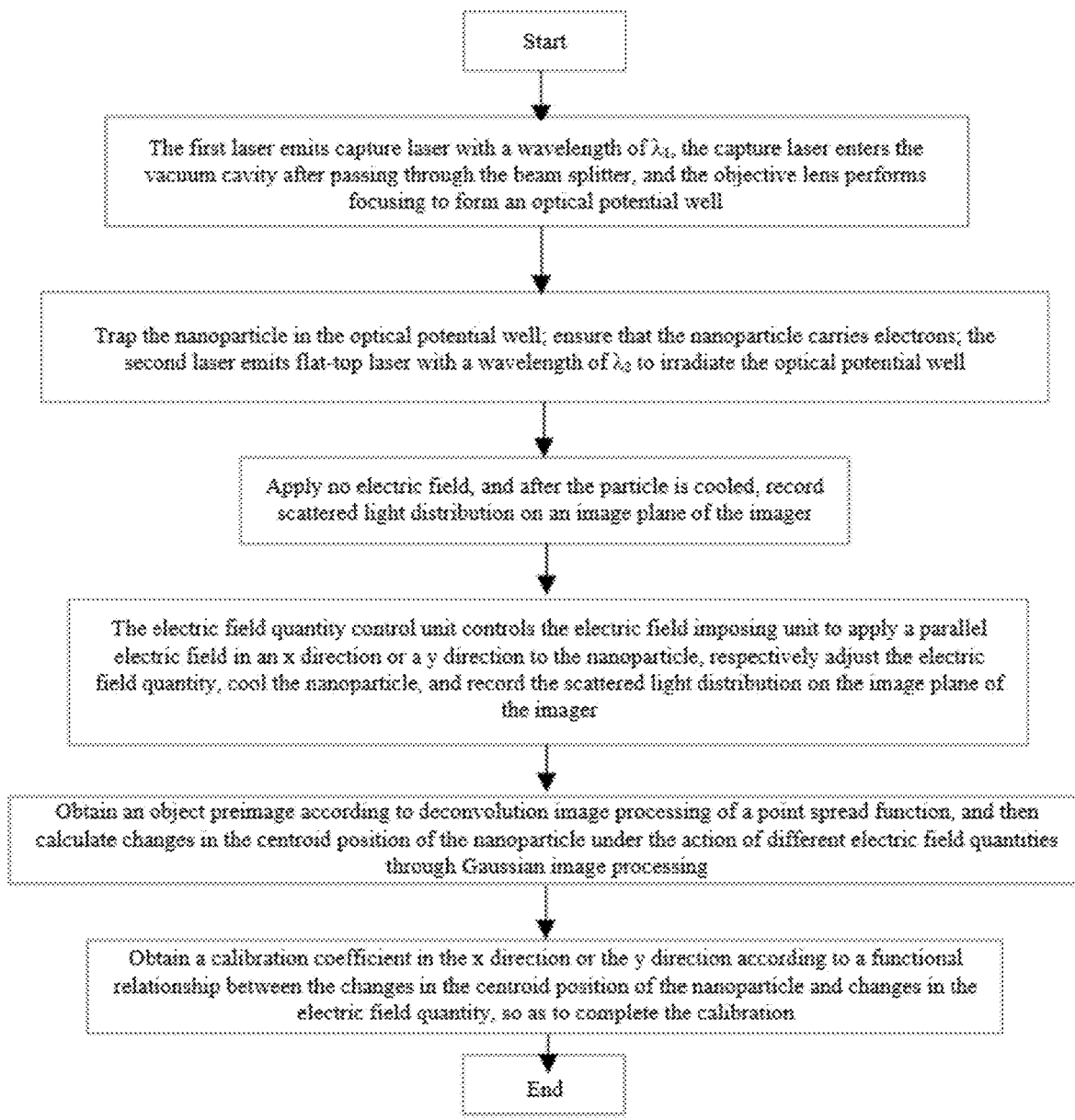
FIG. 4 is a flow diagram of the method of the present invention.

Therefore, as shown in FIG. 4, the optical trap calibration method based on variation of electric field by optical imaging of a nanoparticle of the present invention specifically includes the following steps:

S1: the first laser 1 emitting capture laser with a wavelength of $\lambda_1$, the capture laser entering the vacuum chamber 3 after passing through the beam splitter 8, the objective lens 4 performing focusing to form an optical potential well, and trapping nanoparticle 5 in the optical potential well; ensuring that the nanoparticle 5 carries electrons; the second laser 2 emitting flat-top laser with a wavelength of $\lambda_2$ to irradiate the optical potential well.

S2: applying no electric field, and after the particles are cooled, recording scattered light distribution on an image plane of the imager 11.

S3: controlling, by means of the electric field quantity control unit 7, the electric field imposing unit 6 to apply a parallel electric field in an x direction or a y direction to the nanoparticle 5, respectively adjusting electric field quantity, cooling the nanoparticle 5, and recording the scattered light distribution on the image plane of the imager 11.

S4: obtaining the preimage of the trapped object utilizing deconvolution image processing referring to point spread function, and then calculating changes in the centroid position of the nanoparticle 5 under the action of different electric field quantities through Gaussian image processing.

S5: obtaining a calibration coefficient in the x direction or the y direction according to a functional relationship between the changes in the centroid position of the nanoparticle 5 and changes in the electric field quantity, so as to complete the calibration.

The apparatus and method of the present invention will be described below by a specific embodiment.

In this embodiment, the wavelength of the capture laser emitted by the first laser is 1064 nm, the NA of the objective lens 4 is 0.8, the effective clear aperture D is 0.8, the length of a lens barrel is 200 mm, the wavelength of the flat-top laser emitted by the first laser is 532 nm, and the flat-top laser irradiates the optical potential well vertically, the nanoparticle is a silica microsphere with a radius of 0.05 μm, and the focal length of the lens is 200 mm. The magnification of the system is 100 times, the wavelength of the light emitted by the second laser is 532 nm, and then the resolution of the system is about 500 nm.

The light intensity distribution of the microsphere with the radius of 0.05 μm on the object plane is set as $$o(x,y)=1(x^2+y^2\leq 0.05^2)$$

The magnification of the optical system is 100 times, then on the imaging system $$o(x,y)=1(x^2+y^2\leq 0.05^2)$$

The point spread function of the optical system can be measured. As an example, based on experience, the point spread function of the imaging system can be simplified to a two-dimensional Gaussian function of σ=0.25*100 μm, which is expressed as $$h(x, y) = \frac{1}{2\pi\sigma^2}\exp\left(-\frac{x^2+y^2}{2\sigma^2}\right)$$

The signal obtained by the imaging system is $$h(x, y) = \frac{1}{2\pi\sigma^2}\exp\left(-\frac{x^2+y^2}{2\sigma^2}\right)$$

Figure 5:
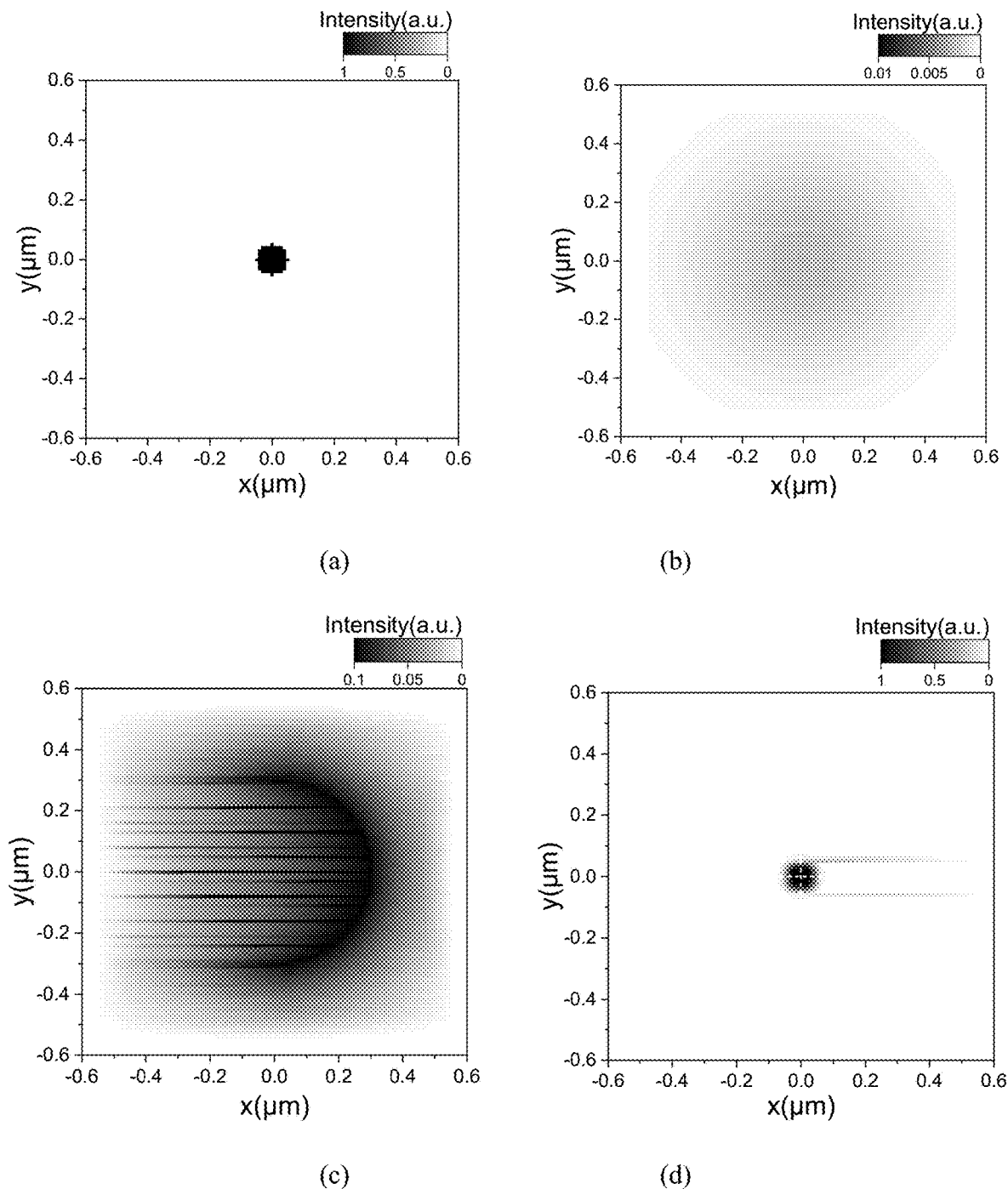
FIG. 5 is an imaging result diagram of a microsphere with a diameter of 0.1 µm at a focal point of the object plane after imaging via a transmission optical system and deconvolution processing via a point spread function, where (a) represents a preimage of an object o(x', y'), (b) represents the point spread function of an imaging system h(x', y'), (c) represents an image i(x', y') outputted after the preimage of the object passes through the imaging system, and (d) represents a deconvolution output image o(x', y').

FIG. 5 shows a simulated imaging result of a microsphere with a radius of 0.05 μm at the focal point of the object plane after imaging via the transmission optical system and after the deconvolution processing of the point spread function.

The image of the nanosphere irradiated by a constant light field is a circular spot with a resolution of about 500 nm; according to the deconvolution of the point spread function, the resolution can be optimized to the order of 10 nm; and further, the change in the centroid position of the particle can be obtained by two-dimensional Gaussian fitting, as shown by the point of intersection of dotted lines in the deconvolution output image o(x', y') in FIG. 5. The operation in an example is simulated to restore the result before magnification by 100 times. It can be seen that a physical image after deconvolution is almost the same as the preimage, so that the calibration accuracy of the present invention can be guaranteed.

Those of ordinary skill in the art can understand that the above descriptions are only preferred embodiments of the present invention and are not intended to limit the present invention. Although the present invention has been described in detail with reference to the foregoing embodiments, for those skilled in the art, they can still make modifications to the technical solutions recorded in the foregoing embodiments, or make equivalent replacements to a part of technical features. All modifications, equivalent substitutions and the like made within the spirit and principle of the present invention shall be included in the protection scope of the present invention.

What is claimed is:

1. An optical trap calibration apparatus based on variation of electric field by optical imaging of a nanoparticle, wherein the apparatus comprises a first laser, a second laser, a vacuum chamber, an objective lens, an electric field imposing unit, an electric field quantity control unit, a beam splitter, a filter unit, a convex lens, and an imager;

the beam splitter, the objective lens and the electric field imposing unit are sequentially arranged on an optical axis of the first laser; the vacuum chamber encompasses the objective lens and the electric field imposing unit, so as to provide a vacuum environment for the nanoparticle; the electric field imposing unit is externally connected to the electric field quantity control unit, and the electric field imposing unit can generate parallel electric fields in three directions of x, y and z;

an optical axis of the second laser is perpendicular to the optical axis of the first laser, and a point of intersection of the two optical axes coincides with a focal point of an optical potential well formed by the objective lens;

the filter unit, the convex lens and the imager are sequentially arranged on a reflection light path of the beam splitter, and the filter unit can isolate an emission wavelength of the first laser and transmit the emission wavelength of the second laser;

a calculation unit calculates, according to scattered light distribution of the nanoparticle recorded by the imager, changes in the centroid position of the nanoparticle under the action of different electric fields, and completes calibration according to a functional relationship between the changes in the centroid position and changes in the electric field quantity; and the imager is placed in a black box to suppress stray light for the imager.

2. The optical trap calibration apparatus based on variation of electric field by optical imaging of a nanoparticle according to claim 1, wherein the beam splitter is a BS beam splitter or a dichroic mirror.

3. The optical trap calibration apparatus based on variation of electric field by optical imaging of a nanoparticle according to claim 1, wherein the filter unit is an isolator or a filter.

4. The optical trap calibration apparatus based on variation of electric field by optical imaging of a nanoparticle according to claim 1, wherein the electric field imposing unit is two pairs of parallel electrode plates.

5. An optical trap calibration method based on variation of electric field by optical imaging of a nanoparticle, wherein the method is implemented based on the apparatus according to claim 1, and the method specifically comprises the following steps:

S1: the first laser emitting capture laser with a wavelength of λ1, the capture laser entering the vacuum chamber after passing through the beam splitter, and the objective lens performing focusing to form an optical potential well, so as to trap the nanoparticle in the optical potential well; ensuring that the nanoparticle carries electrons; the second laser emitting flat-top laser with a wavelength of λ2 to irradiate the optical potential well;

S2: applying no electric field, and after the particle is cooled, recording scattered light distribution on an image plane of the imager;

S3: controlling, by means of the electric field quantity control unit, the electric field imposing unit to apply a parallel electric field in an x direction or a y direction to the nanoparticle, adjusting the electric field respectively, cooling the nanoparticle, and recording the scattered light distribution on the image plane of the imager, wherein the x direction is a polarization direction of optical trap capture laser, a direction of light emitted by the first laser is z direction, and a direction perpendicular to x and z is y direction;

S4: obtaining a preimage of an object utilizing deconvolution image processing referring to point spread function, and then calculating changes in the centroid position of the nanoparticle under the action of different electric field quantities through Gaussian image processing; and S5: obtaining a calibration coefficient in the x direction or the y direction according to a functional relationship between the changes in the centroid position of the nanoparticle and changes in the electric field quantity, so as to complete the calibration.

\* \* \* \* \*